Patented Aug. 19, 1930

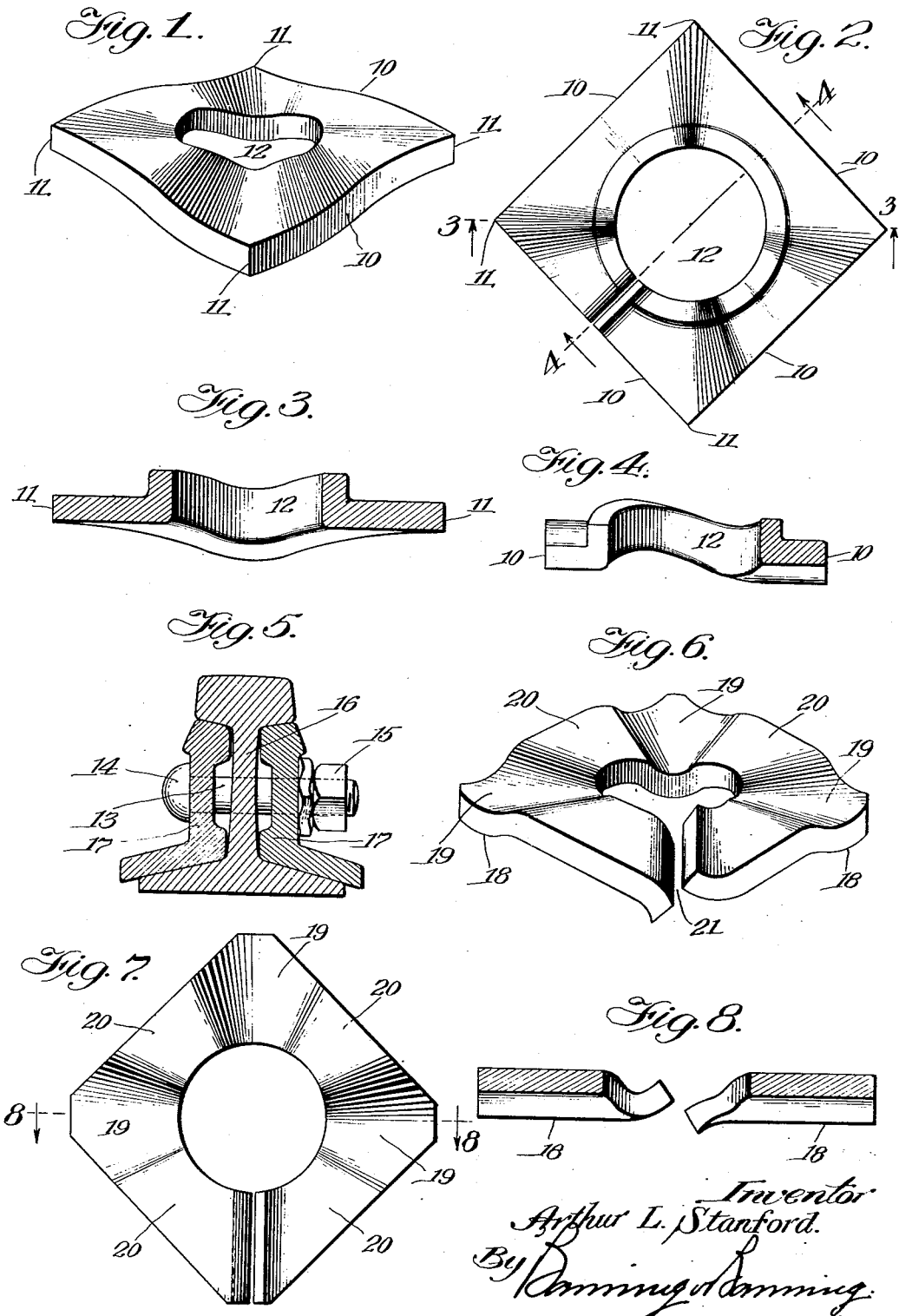

1,773,286

UNITED STATES PATENT OFFICE

ARTHUR L. STANFORD, OF LIBERTYVILLE, ILLINOIS

NUT LOCK

Application filed June 16, 1927. Serial No. 199,143.

This invention is directed to a nut locking washer which is normally of a non-planate formation, and which is adapted to be compressed and flattened by the screwing up of a nut. The nut lock is intended primarily for railroad use in securing the joint bars of connecting rail sections, and, for this purpose, it is highly desirable to provide locking means which will not only exert a very heavy pressure against the nut when screwed to place, but which will also afford a sufficient range of flexibility to compensate for wear occasioned at any one of several points, so that the nut will be maintained in place under spring pressure even though the distance between the bearing faces of the bolt head and the nut be increased either by abrasion or by other causes.

In nut locking washers intended for such service, it is also highly desirable that the compression and flattening of the washer be gradual throughout a considerable range of rotation of the nut, and the washer of the present invention is designed to meet these requirements. It is also desirable to so configure the washer that there will be a progressive increase in the resistance to compression, so that there will be a maximum surface contact along the lines where the pressures are applied, and the washer of the present invention likewise conforms to these requirements.

Further objects and details will appear from a description of the invention in conjunction with the accompanying drawings, wherein—

Figure 1 is a perspective view showing the preferred form of the washer of the present invention;

Fig. 2 is a plan view of the same with an added inner marginal flange;

Fig. 3 is a diagonal sectional view of the washer of Fig. 2;

Fig. 4 is a cross sectional view of the same;

Fig. 5 is a section through a rail and through the joint bars showing the manner of using the present invention;

Fig. 6 is a perspective view of a modified form of the present invention omitting the inner marginal flange;

Fig. 7 is a plan view of the same; and

Fig. 8 is a diagonal sectional view of the same.

The exterior configuration of the washer of the present invention is preferably square, although it might be of other polygonal formation, or in any event of a formation other than circular. As shown, the washer is in the form of a square having four straight sides 10 merging into right angled corners 11. In the center of the washer is the circular bolt hole 12 adapted to receive a bolt 13 having a head 14 and carrying a nut 15 which bears against the washer. As shown, the nut is entered through the web of a rail 16 and through the joint bars 17, as is customary.

In the preferred form, the washer is undulated in such a way as to afford a pair of oppositely directed curves, the axes of which stand in right angle relation to one another. That is to say, the medial or crest line for one of the undulations passes through one pair of diagonally disposed corners, while the medial or crest line for the other curve passes through the other diagonally disposed pair of corners. If desired, the metal struck out from the bolt hole may be swaged over to form a reinforcing inner marginal flange $12^a$ which follows the undulations of the washer as a whole.

The washer being formed of a plate of uniform thickness, each ridge or crest on one side will find a corresponding trough or depression on the other side. Measured circumferentially the alternate oppositely extending crests will stand in the relation of 90° from one another, and the compressibility of the washer will be measured by the vertical distance from the medial crest line of one undulation to the trough line of the next succeeding trough on the same side of the washer. Measured circumferentially, the undulations will follow the line of a sinusoidal curve, the curvature merging unbrokenly through a medial point from a curvature in one direction to a corresponding curvature in the opposite direction, so that no sharp bends or angles will be provided.

The washer may be continuous and unbroken, or it may be provided with a split or gap which preferably, though not necessarily, runs through one of the side edges of the washer so as not to interfere with the reacting power of the metal in the corners, in which case one of the free edges will preferably be struck downwardly below the normal plane, and the other free edge struck upwardly therefrom and curved to a slight degree to secure additional spring action. However, where it is desired to provide a break or gap, the same may be otherwise positioned, as, for instance, through the area of maximum width at the corners of the washer.

In the modified form of washer indicated in Fig. 6, instead of employing the sinusoidal curvature first described, the metal is bent or distorted to form a plurality of radially extending concavo convex ribs all extending in the same direction, that is to say, with all of the crests 18 on one side and all of the channels 19 on the opposite side of the washer. In this configuration, the ribs and corresponding channels extend radially in a diagonal direction to the corners of the washer and the ribs are separated by intervening plane sections 20. In this case, as before, an open gap 21 may be provided extending to one of the corners or elsewhere positioned as may be desired.

In either of the forms of construction, it will be noted that the crest line of each ridge or wave, which is the line of greatest displacement from a flat plane surface, coincides with the diagonal line which represents the maximum width measured from the center hole outwardly. The medial lines of the convolutions thus coincide with the line where the metal stock is of greatest width, so that the maximum resistance to flattening will be centered along this line. Thus when the nut contacts the washer, and a pressure is applied in the turning of the nut, the washer will begin to flatten in the areas intermediate the corners where the width of metal is at a minimum, and the compression toward a true plane will continue progressively toward the corners, the metal along the medial diagonal lines being the most resistant to the compressive tendency.

In view of the fact that in the preferred form, the bearing surfaces, prior to compression will be centered along the oppositely presented crests on the opposite sides of the washer, these surfaces will constitute the bearing surfaces from which pressures will be distributed to intermediate portions of the washer, and since these surfaces are of maximum width measured radially, a greater amount of surface contact will be afforded than would be the case in the use of a ring shaped washer of uniform width throughout.

In the preferred form, moreover, by projecting the convolutions in opposite directions from a medial plane, a maximum potential depth of compression is provided, so that the spring action will be continuously imposed upon the nut throughout a considerable range of adjustment, which is highly desirable not only for the purpose of compensating for wear within widely extended limits, but also because it permits the nut to be gradually and progressively tightened throughout a wide range of turning with a corresponding distribution of the flattening effect on the washer throughout a wide range.

In the modified washer, the characteristic features of the preferred washer are in the main present, although the range of compression is less and the curves are more abruptly formed. At the same time, the modified form might be advantageously employed, especially in cases where a flat plane bearing surface is desired, which, as shown, will be afforded by the plane surfaces intermediate the corners.

The primary function of the lock spring washer is to secure great resistance to compression, which equals the spring tension of the curves plus the frictional resistance, and also to provide expansive power to neutralize vibration and compensate for wear of the contacting surfaces, stretch of bolt, etc. Relief from vibration will also lock the nut. Expansive power equals the spring tension of the washer minus the frictional resistance. The secondary function of the split washer type is to lock the nut against reverse movement by the angular shape and slightly curved position of the spring split ends.

Although the washer of the present invention has been shown as square in its exterior configuration, it is obvious that the features indicated would have application to various polygonal or other forms involving a departure from the ring formation common in washers of this general character. That is to say, the arrangement would have application to any form in which there was a variation in width between the exterior and interior edges of the washer, with a coincidence of the crest lines through the areas of increased width so as to provide an increase in metal stock along the crest lines of the curves.

I claim:

1. A nut lock washer of non-circular exterior configuration and having in its center a circular aperture, the metal of the washer being distorted from its horizontal plane to provide opposing portions uniformly distorted upwardly away from said plane, and intermediate opposed portions uniformly distorted in the opposite direction away from said plane, the crest lines of opposing portions of the washer which are struck in the same direction running radially at substantially uniform elevation through the center of the washer, and said crest lines in each instance extending radially through a portion of the washer where the width measured from the center aperture is greater than the minimum width, substantially as described.

2. A nut lock washer of non-circular exterior configuration and having in its center a circular aperture, the metal of the washer being distorted from its horizontal plane to provide opposite portions uniformly distorted upwardly away from said plane, and intermediate opposed portions uniformly distorted in the opposite direction away from said plane, the medial crest lines of opposing portions of the washer which are struck in the same direction running radially at substantially uniform elevation through the center of the washer through portions thereof having a radial width of material greater than the minimum, the center aperture being surrounded on one side by an upstanding marginal flange varying the surface contour of the washer, substantially as described.

3. A nut lock washer of substantially square exterior configuration and having in its center a circular aperture, the metal of the washer being distorted from its horizontal plane to provide opposing portions uniformly distorted upwardly away from said plane, and intermediate opposed portions uniformly distorted in the opposite direction away from said plane, the medial crest lines of opposing portions of the washer which are struck in the same direction running radially at substantially uniform elevation from opposed corners and through the center of the washer, substantially as described.

4. A nut lock washer of polygonal exterior configuration and having in its center a circular aperture, the metal of the washer being distorted from its horizontal plane to provide opposing portions uniformly distorted upwardly away from said plane, and intermediate opposed portions uniformly distorted in the opposite direction away from said plane, the crest lines of opposing portions of the washer which are struck in the same direction running radially at substantially uniform elevation from opposed corners and through the center of the washer, the washer being provided with a gap having the free edges of the metal struck away from alignment with one another, substantially as described.

5. A nut lock washer of non-circular exterior configuration and having in its center a circular aperture, the metal of the washer being distorted from its horizontal plane to provide opposing portions uniformly distorted upwardly away from said plane, and intermediate opposed portions uniformly distorted in the opposite direction away from said plane, the crest lines of opposing portions of the washer which are struck in the same direction running radially at substantially uniform elevation from opposed corners and through the center of the washer, and said crest lines in each instance extending radially through a portion of the washer where the width measured from the center aperture is greater than the minimum width, the washer being provided with a gap running through one of said crest lines and having the free edges of the metal struck away from alignment with one another, substantially as described.

6. A nut lock washer of non-circular exterior configuration and having in its center a circular aperture, the metal of the washer being distorted from its horizontal plane to provide opposite portions uniformly distorted upwardly away from said plane, and intermediate opposed portions uniformly distorted in the opposite direction away from said plane, the crest lines of opposing portions of the washer which are struck in the same direction running radially at substantially uniform elevation from opposed corners and through the center of the washer, the center aperture being surrounded on one side by an upstanding marginal flange varying the surface contour of the washer, the washer being provided with a gap running through one of said crest lines and through said flange and having the free edges of the metal struck away from alignment with one another, substantially as described.

7. A nut lock washer of substantially square exterior configuration and having in its center a circular aperture, the metal of the washer being distorted from its horizontal plane to provide opposing portions uniformly distorted upwardly away from said plane, and intermediate opposed portions uniformly distorted in the opposite direction away from said plane, the medial crest lines of opposing portions of the washer which are struck in the same direction running radially at substantially uniform elevation from opposed corners and through the center of the washer, the washer being provided with a gap running through one of said crest lines and having the free edges of the metal struck away from alignment with one another, substantially as described.

ARTHUR L. STANFORD.